United States Patent [19]

Clark

[11] 4,454,762
[45] Jun. 19, 1984

[54] MEASUREMENT SYSTEM WITH REMOTE DISPLAY

[75] Inventor: Earl S. Clark, Coventry, R.I.

[73] Assignee: Federal Products Corporation, Providence, R.I.

[21] Appl. No.: 390,236

[22] Filed: Jun. 21, 1982

[51] Int. Cl.³ .................... G01B 7/00; G01R 13/02
[52] U.S. Cl. ........................... 73/432 A; 33/174 L; 331/65
[58] Field of Search ............... 340/870.31; 350/331 R, 350/336; 33/172 E, 166, 174 L; 324/99 D; 331/116 R, 65; 73/432 A

[56] References Cited

U.S. PATENT DOCUMENTS

| | | | |
|---|---|---|---|
| 3,513,408 | 5/1970 | McGee | 340/870.31 |
| 3,756,081 | 9/1973 | Young | 340/870.31 |
| 3,772,874 | 11/1973 | Lefkowitz | 350/336 |
| 4,118,871 | 10/1978 | Kirkham | 33/174 L |
| 4,289,382 | 9/1981 | Clark | 350/331 |
| 4,401,945 | 8/1983 | Juengel | 331/65 |

OTHER PUBLICATIONS

Stremler, Ferrel G., *Introduction to Communication Systems*, Addison–Wesley Pub. Co., 1977, pp. 210–213.

*Primary Examiner*—Gerald Goldberg
*Assistant Examiner*—Ellwood Harding
*Attorney, Agent, or Firm*—Morse, Altman & Dacey

[57] ABSTRACT

A measurement system is provided in which a work-engaging transducer is connected by means of a cable to a remotely located display unit which is adapted to provide quasi-analog and/or digital display of measurement made by the transducer. The transducer includes an oscillator the output of which is a function of a measurement being made. The display unit presents the measurement made in quasi-analog and/or digital form either in a conventional format such as a circular dial face, in linear form such as a column 82 or in other selected formats of various geometrical configurations and/or in various mathematical progressions to suit particular applications.

6 Claims, 11 Drawing Figures

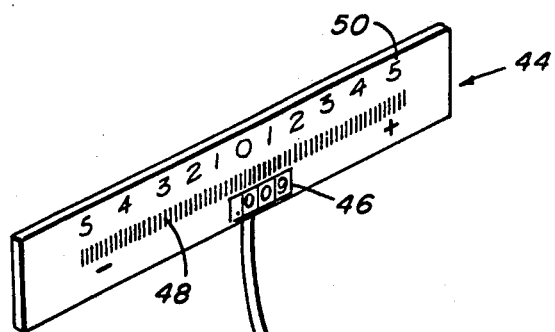
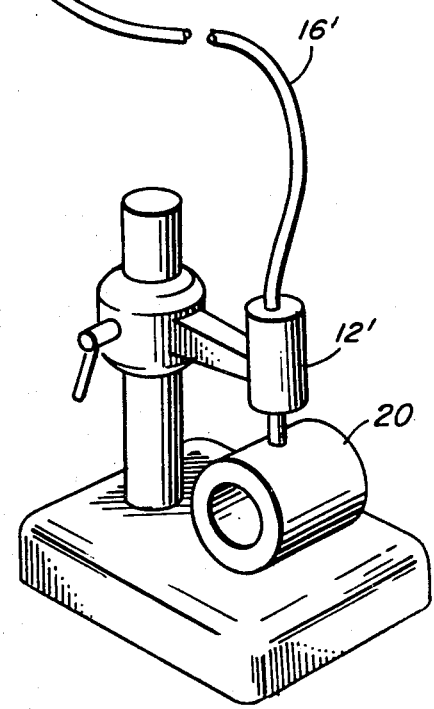
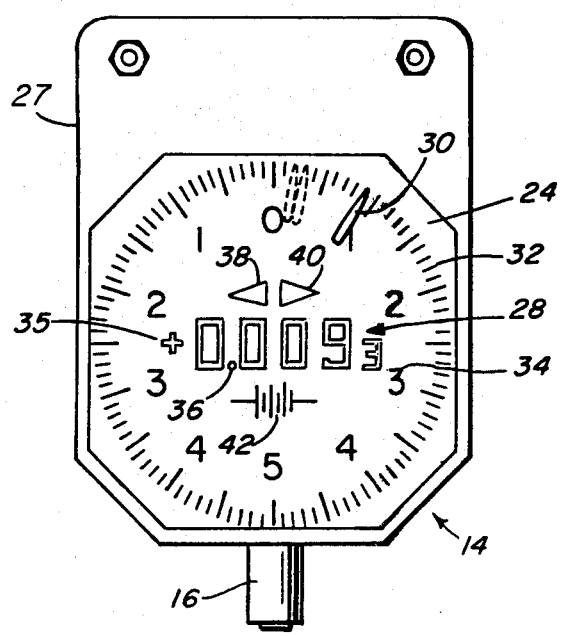
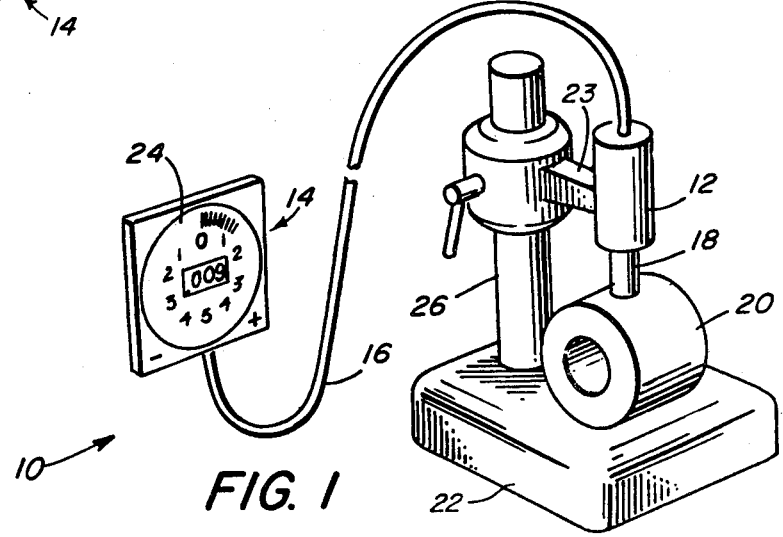
FIG. 2
FIG. 3
FIG. 1

MEASUREMENT SYSTEM WITH REMOTE DISPLAY

BACKGROUND OF THE INVENTION

1. Field of the Invention

This invention relates generally to measuring systems and more particularly is directed towards a new and improved gaging instrument in which a combination quasi-analog and digital display unit is remotely located from a work-engaging transducer providing measurement information to the display unit.

2. Description of the Prior Art

In U.S. Pat. No. 4,289,382 dated Sept. 15, 1981, entitled Measurement System For Machine Parts, there is disclosed a device for measuring dimensions of machine parts or the like, which device provides functions similar to those of a dial indicator except that the output display is presented in both quasi-analog and digital form. The device typically is used by mounting it to a support bracket with the measuring stem thereof in contact with the workpiece. The stem is coupled to a transducer employed to generate signals which, when processed through logic circuitry, operate the display to provide both quasi-analog and digital information with respect to the measurement being made.

While the system disclosed in the above patent functions properly and in the manner intended, it has been found that if several of such measuring instruments are to be mounted to engage different parts of the same workpiece, the area around the workpiece can become overly crowded. Under such conditions it becomes difficult to locate several instruments with respect to the workpiece and still be able to conveniently make the desired measurement and position the display face so that it can be readily viewed.

It is, therefore, an object of the present invention to provide improvements in instruments of the sort shown in U.S. Pat. No. 4,289,382.

Another object of this invention is to provide a measuring system in which the measurement display is remotely located from the work engaging member.

SUMMARY OF THE INVENTION

This invention features a measuring system comprising a transducer adapted to be located in position to engage the workpiece being measured and a display unit located remotely from the transducer and presenting the measurement information in both digital and quasi-analog form. The transducer includes an oscillating circuit the output of which is converted to digital signals which through logical processing drives the remote display unit to present the measured quantity both in digital form as well as quasi-analog form. The quasi-analog form may include different displays such as linear or circular, for example. Both the digital and the quasi-analog display change in accordance with the measured quantity. The oscillator operates at a relatively high frequency to provide a high sampling rate, quick response, and high resolution. The measurement information is contained in the difference in frequencies of pulse samples produced at the transducer and transmitted via a cable between the transducer and the display unit. The transmission of information by FM has been used in the past for various purposes and is desirable in the present system because of its typical high frequency which makes possible speed and resolution in the operation of the system and is relatively free from interference.

BRIEF DESCRIPTION OF THE DRAWINGS

FIG. 1 is a view in perspective of a measuring system made according to the invention showing the remote display in circular format, FIG. 2 is a view similar to FIG. 1 but showing a remote display in a linear format, FIG. 3 is a view in front elevation of a display face similar to that employed in the FIG. 1 embodiment.

DETAILED DESCRIPTION OF THE PREFERRED EMBODIMENTS

Figure 7:
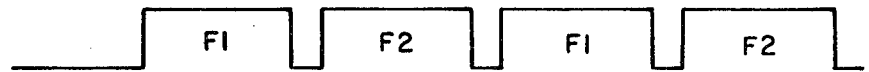
FIG. 7 is a diagram illustrating the output of the transducer.

Referring now to the drawings and to FIG. 1 in particular, there is illustrated a gaging system generally indicated by the reference character 10 and comprised of a transducer 12 and a remote display unit 14 connected to the transducer by means of a cable 16. The transducer is provided with a movable stem 18 adapted to engage a workpiece 20. The workpiece may be mounted on a stand 22, as illustrated, with the transducer 12 positioned against the workpiece by means of an adjustable bracket arm 23 carried on an upright post 26. Obviously the transducer can be mounted at other measurement stations such as in position to engage a workpiece on a lathe, milling machine or the like where measurements may be made as work is in progress. The display unit 14 in the FIG. 1 embodiment is provided with a circular display face 24 on which the measurement made by this instrument is presented in both digital and quasi-analog form. While it is preferred that the display present the measurement in both quasi-analog and digital form, if desired, the display can be in either digital or quasi analog.

A display face 24, best shown in detail in FIG. 3, is on the front of a housing 27 which contains part of the electronic circuitry employed in the system. The display elements on the face 24 generally comprise a group of digits 28, typically fabricated from liquid crystals or light emitting diodes, for example, adapted to present numerical data corresponding to the measurement being made. The group of digits 28 may be located at any convenient part of the face of the dial and, in the illustrated embodiment, the group is disposed in the center portion of the dial.

Surrounding the group of digits 28 is a circular array of radial segments 30, preferably liquid crystals, light emitting diodes or the like and adapted to be illuminated by the circuitry with the number of segments 30 illuminated corresponding to the particular digital number illuminated in the group of digits 28. In the illustrated embodiment the display face is provided with one hundred and one such radial segments 30. Obviously this number may be increased or decreased according to particular applications. Also, while a full circle is shown for the radial segments 30, obviously a partial circle may be used particularly where the range of operation is relatively small.

The segments 30 of the illustrated embodiment extend around the full circle and the number of segments illuminated during operation correspond to the measurement being made with the leading illuminated segment being analogous to the position of a pointer on a dial indicator. Preferably, all of the segments within an arc commencing at "0" to the maximum measurement are illuminated so that in the illustrated embodiment for a digital reading of 0.009 the arc of segments 30 between 0 and 9 on the scale will be illuminated while all others would be extinguished. If the actual measurement were 0.020, for example, the first twenty of the segments would be illuminated. In use, if the measurement is varying the number of illuminated segments will vary accordingly so that the arcuate band of illuminated segments 30 will lengthen and shorten according to the measurement variation with the leading illuminated segment at any instant corresponding to the actual measurement. At the same time any measurement variation will also be presented on the digital display 28 on the dial face. Thus, at any given time the measurement may be observed by reading the group of digits 28 and/or by observing the position on the leading illuminated segment 30 which is analogous to the needle position on a gage.

The dial face is provided with a fixed circular array of scale markings 32 concentric with the segments 30 and in close relation to an arcuate array of numerals 34 fixed on the dial face. The scale markings 32 provided for each segment indicate some form of measurement either in thousandths of an inch, tenths of an inch, appropriate metric system units, volts, millivolts, milliamps, amps, grams or whatever units correspond to the variable being measured and, accordingly, suitable digits and scale divisions as seen in FIG. 3 are provided.

In addition to the group of digits 28, a display symbol 35 adapted to illuminate as a plus or as a minus is provided to the left of the group of digits in order to indicate a plus or minus condition in the measurement. A decimal point 36 is also provided in association with the digital display 28. For certain applications it is desirable to determine when a workpiece is within a specified tolerance. In such cases means are provided for putting into the memory of the device an upper limit of measurement as well as a lower limit of measurement and when these are reached or exceeded segments such as the triangular indicia 38 or 40 can be illuminated. Also conveniently provided is a battery condition indicia 42 adapted to be illuminated in the event that the battery employed in the system requires replacement.

Referring now more particularly to FIG. 2, there is illustrated a modification of the invention and in this embodiment the transducer 12' is connected via the cable 16' to a display unit 44 which is in a linear format as opposed to the circular format of the FIG. 1 embodiment. The display can be provided in other geometric shapes such as oval, for example, and the increments can be evenly spaced, as shown, or in other mathematical progressions, such as logarithmic, for example. As in the principal embodiment the display presents the measurement in both quasi-analog and digital form with a group of digits 46 presenting the measurement in digital form while a series of segments 48 arranged in a straight line present the measurement in quasi-analog form. In the illustrated embodiment, the zero position is at the center of the linear segments 48 with fixed Arabic numerals 50 appearing in a straight line above (or below) the straight line segments 48. As before, the segments are illuminated corresponding to the measurement being made and the segments can be illuminated either to the right or to the left indicating a positive or negative measurement. While the segments are shown in a horizontal row, obviously they can be arranged in a vertical column if desired and the measurement can originate at either end of the row or column of segments if that which is being measured has no negative value. Operation of the display unit 44 is otherwise similar to that of the unit 14 in the principal embodiment.

Figure 4:
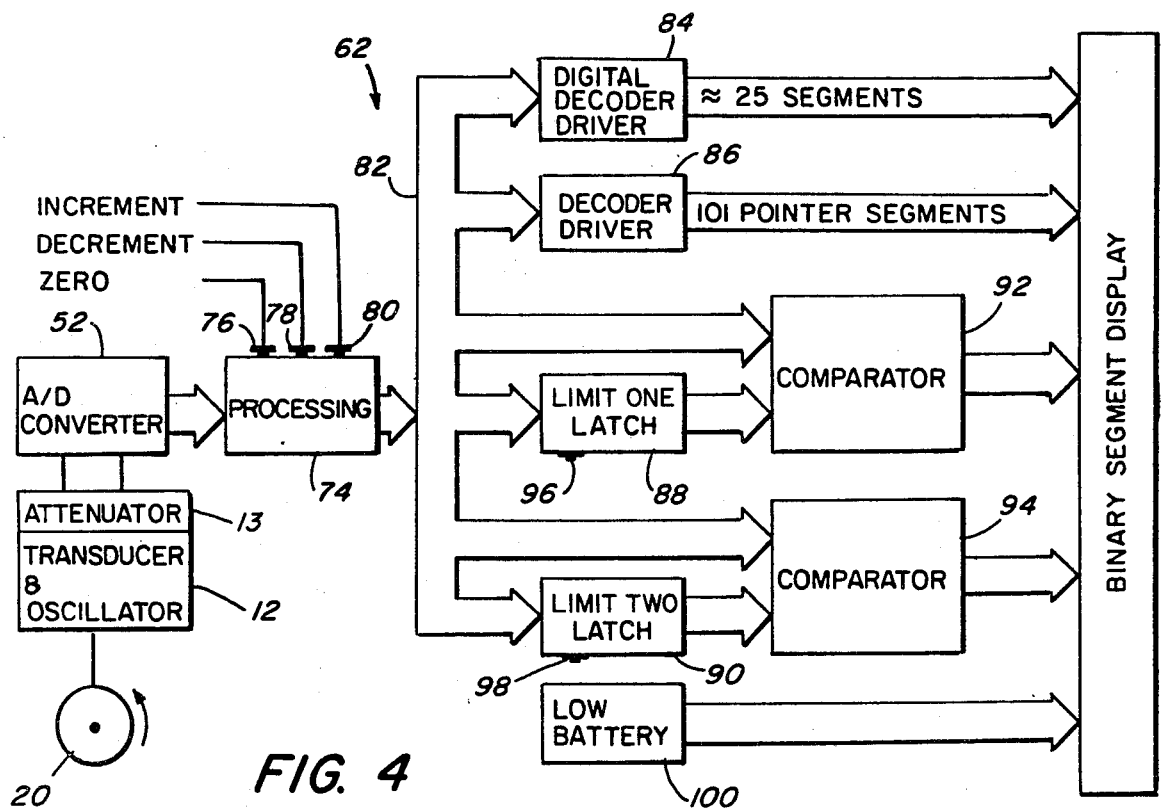
FIG. 4 is a block diagram of the system made according to the invention.

Referring now to FIG. 4 there is illustrated in block form the logic circuit employed in the present invention for converting a measurement made by the transducer 12 on the workpiece 20 into the quasi-analog and digital display information presented in the FIGS. 1 and 3 embodiment. As shown, the transducer 12 also includes an oscillator within the transducer head and, in practice, it has been found that an oscillator operating at approximately 500 kHz provides very satisfactory performance. The transducer oscillator output is fed into an analog to digital converter 52 which provides the digital signals employed in the logic circuitry.

Figure 6:
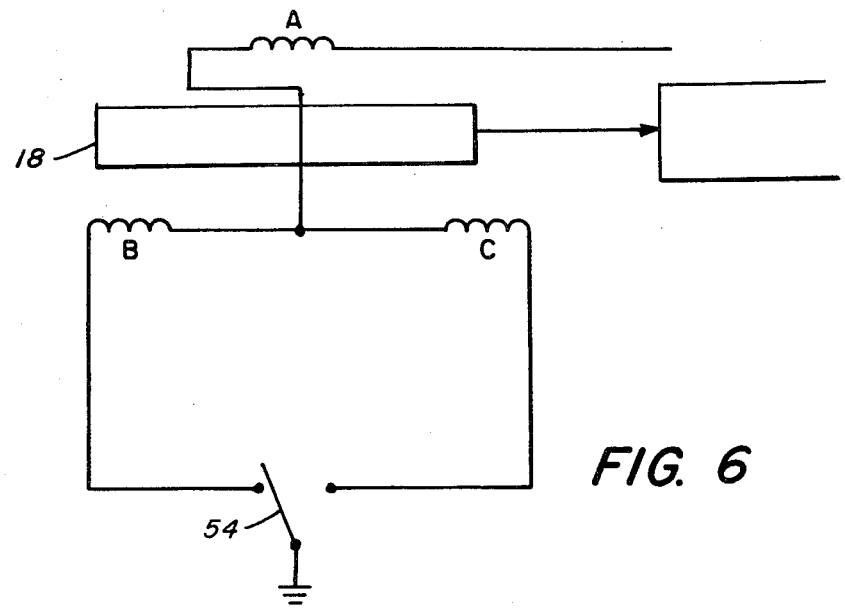

The transducer may take a variety of different forms but in practice it has been found that a differential transformer adapted to produce a frequency differential provides satisfactory performance and consists typically of a primary coil A (FIG. 5) and a pair of secondary coils B and C in operative relation to a movable core (FIG. 6) forming part of or connected to the measuring stem. The coils when energized form part of the oscillator circuit and function preferably at about 500 kHz for reasons to be set forth below. In the preferred embodiment the information with respect to the core position 18 is determined by a difference frequency between a pair of frequencies, each frequency being determined by coil pairs A and B or A and C and the position of the core 18. As shown in FIG. 6 a switch 54 is employed to first transmit a frequency (F1) produced by coils A and B. Next, the switch flips to another position in order to transmit a second frequency (F2) produced by coils A and C. The switch will change from one position to another at a selected rate, typically 32 times per second, so that a train of signals F1, F2, F1, F2 etc. is transmitted to the remote display unit 14 where the signals are processed for the purpose of measuring the difference in frequency between the signals F1 and F2. It is this difference that represents the actual measurement made by the movable core 18.

By operating the oscillator at a frequency such as 500 kHz the output of the oscillator is affected minimally by local interferences.

Figure 5:
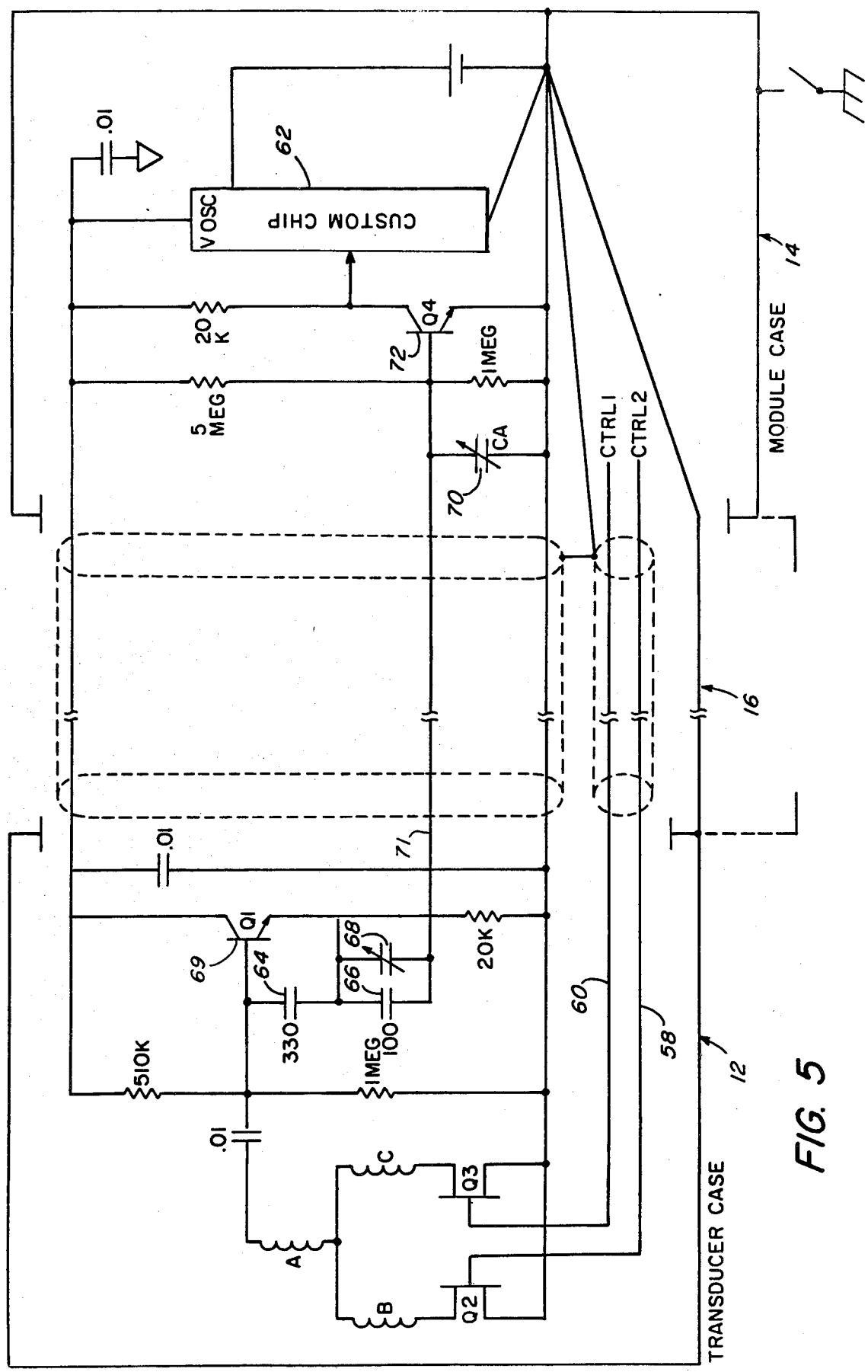
FIG. 5 is a circuit diagram, somewhat schematic, of the system, and, FIG. 6 is a circuit diagram of the transducer portion of the invention.

In order to further enhance the accuracy and reliability of the system, the signal from the oscillator is attenuated prior to transmission over the cable 16 and then amplified at the remote display unit 14. To achieve this attenuation, an attenuating means 13, observe FIG. 4, is operatively associated with the transducer 12 and is connected to the oscillator also found within the transducer 12. In FIG. 5, the attenuating means in shown comprising an NPN transistor 69 (Q1), having capacitors 64, 66 and 68 in its emitter-base circuit. The attenuated signals then are transmitted via a lead 71 and the cable 16 to transistor Q4 located in the remote display unit 14. This is done for the reason that the cable functions as a distributed capacitor and, therefore, forms part of the oscillator circuit. Any change in the capacity of the cable would thus change the frequency of the oscillator. This effect is greatly reduced by attenuating the signal at the transducer and in practice it has been found that an attenuation of 1/10th, for example, at the transducer end of the cable followed by a 10X amplification at the display unit restores the transmitted signal to its original amplitude and eliminates substantially any capacitive change in the cable. The connection is made at a low impedance point and the result is that the effect of the cable on the circuit is greatly reduced. For example, if the capacitance of the cable represented 10% of the capacity of the entire circuit, by tapping at a low impedance point the capacity of the cable thus would contribute only 1% of the capacitance of the circuit.

In the circuit as shown in FIG. 5 the switching action is provided by transistors Q2 and Q3 which produce the same action as the simplified circuit diagram of FIG. 6 in which a mechanical switch 52 is illustrated for the sake of simplicity. The transistor Q2 and Q3 are controlled by leads 58 and 60 which connect via the cable 16 to a custom chip 62 containing the logical functions and display elements shown in FIG. 4. The oscillator circuit can be tuned either at the transducer end by means of capacitors 64, 66 and 68 or by a capacitor 70 at the display unit. The illustrated circuit is designed to resonate at 500 kHz. As may be seen in FIG. 5, most of the oscillator is contained in the transducer part of the systems. The display unit also contains a transistor 72 used to amplify the signal, typically by a factor of 10, to restore the signal that has been attenuated at the transducer as described above.

Figure 8:
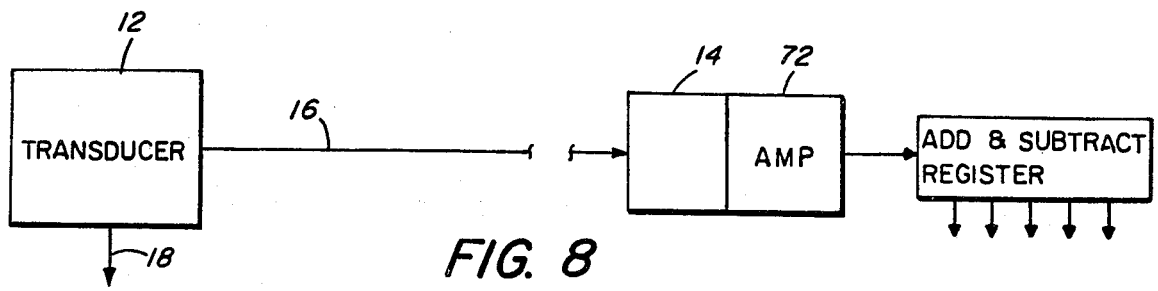
FIG. 8 is a block diagram showing a portion of the system.

In the system the signals are digitized immediately upon coming out of the transducer and cable. This is best shown in FIG. 8 where it will be seen that the output of the transducer 12 is fed through the cable 16 to the unit 14 in which is located the amplifier 72. The output of the amplifier 72 is to an add/subtract register functioning as the A/D converter 52. The signal in the cable 16 and in the lead between the amplifier 72 and the add/subtract register is a variable frequency signal which must be interpreted as an AC analog signal since it can be varied with infinite resolution and therefore is not digital. The output of the add/subtract register is the first point in the system at which there is a digital signal, which by definition is one in which the resolution is limited, one in which there are discrete, countable steps from one level to another. By using AC signals the problems of drift inherent in a DC system are avoided. Since the system relies upon the measurement of a difference in frequency, drift does not become a factor in the circuit. This provides a very stable system which is substantially unaffected by ambient conditions that might interfere with other types of systems. By using an operating frequency of 500 kHz a very high resolution in the display is obtained coupled with a very high speed of response to changes in measurements. While satisfactory performance has been obtained with an operating frequency of 500 kHz, the system could be operated at higher or lower frequencies such as 200 kHz or 1 mHz or so, for example, and still provide satisfactory performance in response and resolution.

The cable may be provided in various lengths and in practice a cable length of four feet has been found satisfactory for most applications. Obviously this can be changed to meet specific requirements. In practice the cable should be shielded at least with respect to the oscillator leads as shown in FIG. 5. By providing a remote readout it is possible to locate a great many transducers within a very small space in order to carry on a number of simultaneous readings on different sections on the same part.

The signals from the A/D converter 52 are fed into processing circuitry 74 consisting of logic gates interconnected in a certain prescribed manner enabling their use for carrying out such operations as digital signal comparison, counting, bit incrementing and decrementing and signal power amplification. The circuitry is also designed to accept inputs from manually actuated switches 76, 78 and 80 to alter the circuit's function. An additional function of the circuitry 74 is to provide electrical signal outputs to external computers, signal processors, process control systems, statistical analyzers and the like. The signal processing circuitry 74 may use a memory location which will be loaded with the contents of a bus 82 when the zero switch 76 is actuated. This number will be subtracted from future readings. The increment switch 80 will cause this stored number to increase at the rate of approximately two numbers per second as long as the switch is held closed. The decrement switch 78 will cause this stored number to decrease at the rate of approximately two numbers per second as long as the switch is held closed.

The bus 82 is connected to a digital decoder driver 84, decoder driver 86, limit one latch 88, limit two latch 90, and also to a comparator 92 and a comparator 94. Decoder driver 84 provides sufficient voltage for driving approximately 25 segments which represent all of the digits of the digital display 28 and will take a binary coded input from bus 82 and will drive up to 101 segments of the segmented quasi-analog display 30 as seen in FIG. 3. The arrangement is such that in the decoder driver 86 it can be said that it is driven from the least significant digit in the display 30. Thus, when it reaches zero effectively it will either increment or decrement by one causing a different position to illuminate adjacent to the previously illuminated position. For example, if it increments by one and assuming that the second segment was illuminated, then the third segment will become illuminated at the time of the increment. The decoder driver 84, however, is responsive to true position on all digits, and thus the fifth digit will operate as what can be termed an interpolated numeral of the analog display or, for example, a grad splitter. As seen in FIG. 3, for example, it will be noticed that the quasi-analog display shows by illuminated position the digit 9 represented by the full line leading segment 30 while the digital display shows 0.00093, the last digit being effectively the fifth digit on bus 82 to which the decoder driver 84 is responsive, and of course, indicates that the actual position as seen by the transducer 12 is three-tenths of the way between 9 and 10.

Limit latch 88 is used to store a reading by pressuring a button 96, and it can be seen that if a reading is stored in latch 88 and the reading is found on the bus 82, the comparator will store an annunciator such as 38 as seen in FIG. 3 on the display. A similar operation occurs for limit latch 90 on the drawings, and this again can store a different reading in an opposite direction by pressing button 98, and when its comparator 94 finds that reading, then it will pulse the other annunciator 40.

For convenience of operation a low battery sensor 100 may be provided which will be sensitive to the battery voltage, and if the battery voltage drops below a preset level will pulse the display 42 and shut down the rest of the system.

Figure 9:
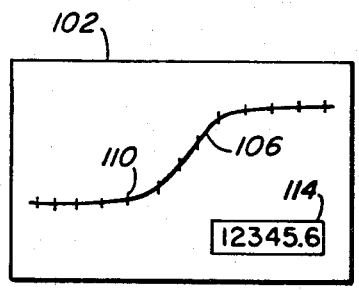
FIG. 9 and 10 are front elevations showing two different display formats, and, FIG. 11 is a perspective view showing a modification of the invention.
Figure 10:
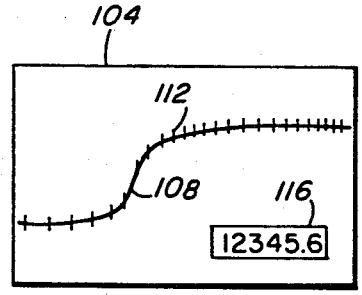

While the principal embodiments of the invention have shown the system used with either a circular of linear format in the display, a great variety of display formats can be employed. In FIGS. 9 and 10, for example, display formats 102 and 104 are provided with curves 106 and 108 for the quasi-analog display. In FIG. 9 segments 110 are evenly spaced along the curve 106 while in the FIG. 10 embodiment segments 108 are spaced by a different mathematical progression. In each case a digital display 114, 116 is provided in cooperative association with the quasi-analog display.

Figure 11:
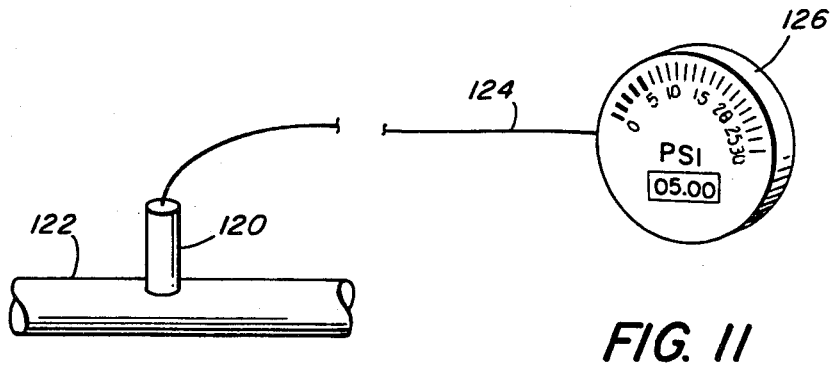

While the system has been described and illustrated particularly in connection with the measurement of dimensions, it could obviously be modified to measure other physicals quantities such as voltage, current, pressure, temperature and the like, it being necessary only to couple the movable core of the transducer to a device responsive to the particular physical quantity being measured. For example, the core could be connected to a movable member in a pressure gauge or other such device as suggested in Fig. 11 wherein a transducer 120 is connected to a conduit 122 and responds to the pressure therein. The transducer connects via a cable 124 to a remote display 126. Other modifications will appear to those skilled in the art.

Having thus described the invention, what I claim and desire to obtain by Letters Patent of the United States is:

1. A system for gaging a dimension of a workpiece, comprising
   (a) a transducer, said transducer provided with a moveable stem adapted to engage said workpiece for gaging the dimensions thereof;
   (b) an oscillator mounted to and operatively associated with said transducer and adapted to generate output signals corresponding to said gaging of the dimensions of said workpiece;
   (c) attenuating means operatively associated with said transducer and coupled to said oscillator for attenuating said oscillator output signals;
   (d) a display unit remote from said transducer and adapted to display a measurement made by said transducer in at least one of quasi-analog and digital forms;
   (e) conduit means connecting said transducer to said display unit;
   (f) amplifying means at said display unit for amplifying said attenuated signals after transmission through said conduit means;
   (g) signal converting means at said display unit for converting said output signals to digital signals, and, digital signal processing means connected to said converting means and to said display unit for controlling said display to present a display output representative of said measurement in at least one of a quasi-analog and digital form.

2. A system accoding to claim 1 wherein said display unit includes a plurality of variable digital symbols responsive to said digital signals and adapted to display said measurement in digital form and a curve provided with a plurality of changeable segments responsive to said digital signals for simultaneously displaying said measurement in quasi-analog form.

3. A system according to claim 2 wherein said segments are evenly spaced along said curve and wherein said symbols and said segments are comprised of material adapted to be illuminated upon actuation thereof.

4. A system for measuring a physical condition, comprising
   (a) a transducer responsive to said condition;
   (b) a display unit remote from said transducer and adapted to display a measurement made by said transducer in both quasi-analog and digital forms;
   (c) conduit means connecting said transducer to said display unit;
   (d) an oscillator mounted to and operatively associated with said transducer and adapted to generate output signals corresponding to said measurement for transmission through said conduit means to said display unit;
   (e) attenuating means operatively associated with said transducer and coupled to said oscillator for attenuating said oscillator output signals prior to transmission through said conduit means, and amplifying means at said display unit for amplifying said attenuated output signals after transmission through said conduit means;
   (f) signal converting means at said display unit for converting said output signals to digital signals; and,
   (g) digital signal processing means connected to said converting means and to said display unit for controlling said display to present a display output representative of said measurement in both quasi-analog and digital form.

5. A system according to claim 4 wherein said display unit includes a plurality of variable digital symbols responsive to said digital signals and adapted to display said measurement in digital form and a curve provided with a plurality of changeable segments responsive to said digital signals for simultaneously displaying said measurement in quasi-analog form.

6. A system according to claim 5 wherein said segments are unevenly spaced along said curve and wherein said symbols and said segments are comprised of material adapted to be illuminated upon actuation thereof.

* * * * *